Figure 1:
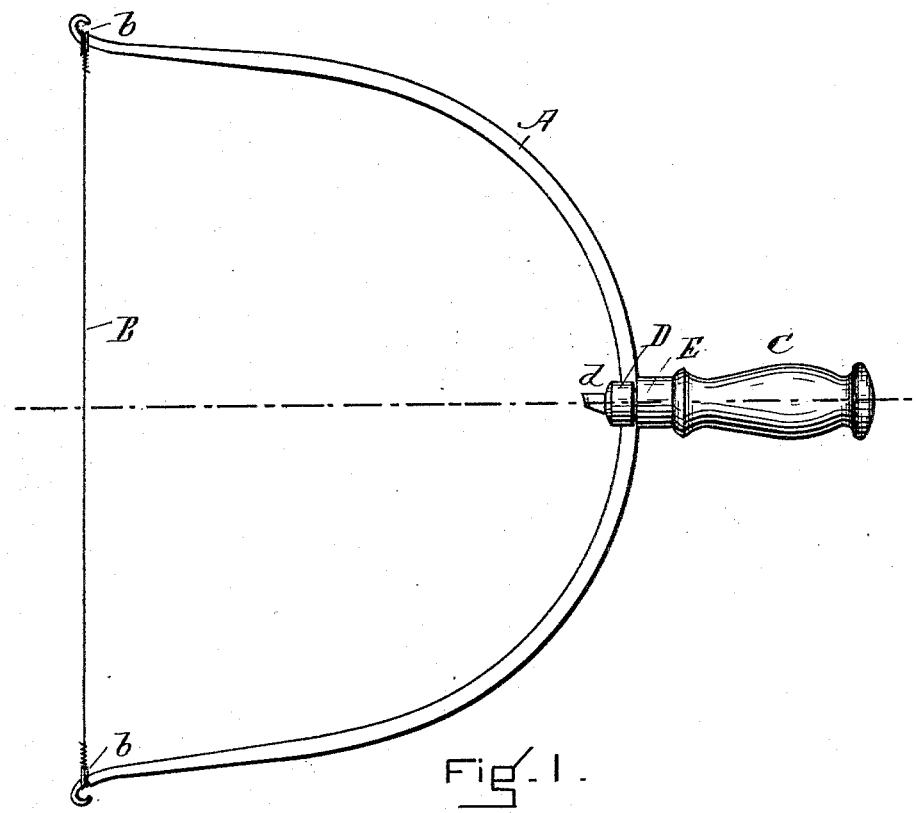

(No Model.)

E. G. BENNETT.
CHEESE OR BUTTER CUTTER.

No. 546,377. Patented Sept. 17, 1895.

WITNESSES
Frank G. Parker
Edward S. Day

INVENTOR
Edwin G. Bennett

UNITED STATES PATENT OFFICE.

EDWIN G. BENNETT, OF EVERETT, MASSACHUSETTS.

CHEESE OR BUTTER CUTTER.

SPECIFICATION forming part of Letters Patent No. 546,377, dated September 17, 1895.

Application filed December 11, 1894. Serial No. 631,450. (No model.)

*To all whom it may concern:*

Be it known that I, EDWIN G. BENNETT, of Everett, in the county of Middlesex and State of Massachusetts, have invented a new and useful Improvement in Cheese or Butter Cutters, of which the following, taken in connection with the accompanying drawings, is a specification.

The object of my invention is to construct an implement for cutting cheese, butter, soap, &c., into layers of any required thickness for the convenience of salesmen in distributing it to their customers. I attain this object by mechanism illustrated in the drawings.

Figure 2:
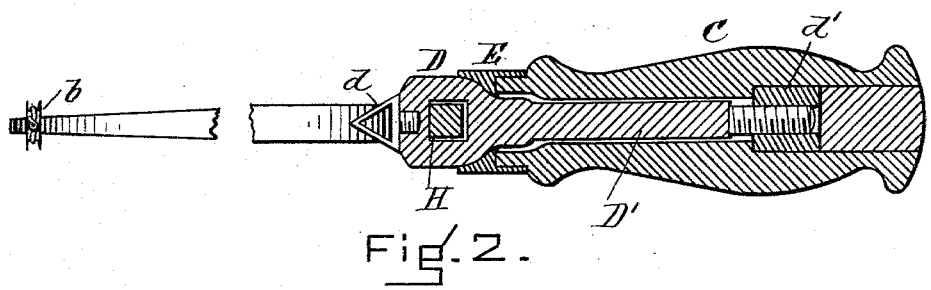

Figure 1 is a plan view, and Fig. 2 is an enlarged sectional view.

A is a strong spring-bow, formed, preferably, of square steel bent somewhat in the form of the letter U and drawn down smaller toward the ends and terminating in suitably-formed hooks.

B is a fine strong wire, having at each end small metallic rings $b\,b$, their edges being grooved for the reception of the wire, and adapted to be slipped onto the hooked ends of the spring-bow A.

C is a handle, made of wood or other suitable material.

D D' is a metal shank-piece, made of cast composition or iron, having a square hole H through it near one end, through which the spring-bow is inserted; also a small threaded hole in its head inside the spring-bow, in which to screw the shank end of a small delta-shaped cutter $d$, which may be removed when desired. I do not confine myself to this form of cutter, as a short thick knife with a single cutting-edge may be used.

E is a metal ferrule, one part of the inside formed to fit upon a conical part of the head D of the shank-piece D D', and the other part fitting upon one end of the handle C. The shank-piece D D' passes through the ferrule E and up inside of the handle C, and its end being threaded engages with a nut $d'$, which is fixed within the handle C and held in position by a tightly-fitting plug. The handle is securely fastened to the center of the spring-bow by giving it a rotary motion with the hand, causing the fixed nut $d'$ to pass onto the threaded end of the shank-piece D D', thereby pressing the ferrule E firmly against the steel spring. The small cutter $d$ is used for cutting a groove in the cloth bandage and hard rind of the cheese, through which groove the cutting-wire may be drawn.

In cutting cheese I place the spring and wire around the cheese, and by drawing it around, keeping the small cutter $d$ in contact, a small groove is cut in the cloth band wherever it is desired to cut the cheese.

In cutting butter I turn the tub bottom up and remove the tub, leaving the butter standing on the cover. I then pass the wire over beyond the mass, and with one hand draw it through, cutting it into as many layers as is desired.

Having fully described my invention, what I claim, and desire to secure by Letters Patent, is—

1. In a cheese and butter cutter, the combination of a bow, a cutting wire and a shank piece D D' as described, with a short knife, suitably attached to the inner end of the shank piece D D', adapted to cut through the hard rind of the cheese so as to admit of the passage of the cutting wire B, substantially as and for the purpose set forth.

2. In a cheese-cutter, the combination of a bow, cutting wire and handle as described, with a delta shaped knife $d$ located in the inner end of the handle, adapted to cut away a portion of the rind of the cheese to admit of the free working of the wire B, substantially as and for the purpose set forth.

In testimony whereof I have signed my name to this specification, in the presence of two subscribing witnesses, on this 10th day of December, A. D. 1894.

EDWIN G. BENNETT.

Witnesses:
FRANK G. PARKER,
EDWARD S. DAY.